Sept. 21, 1954    C. E. STOSBERG ET AL    2,689,428
MINNOW BUCKET
Filed April 15, 1953
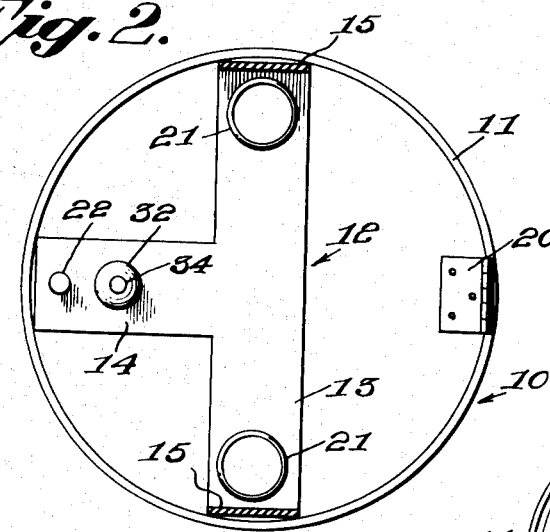
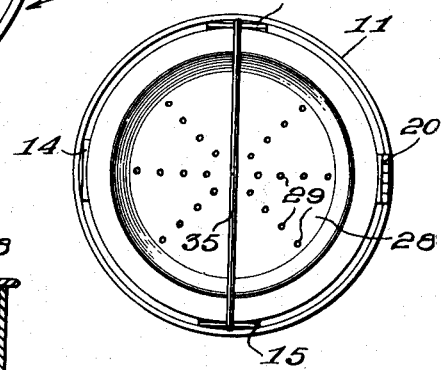
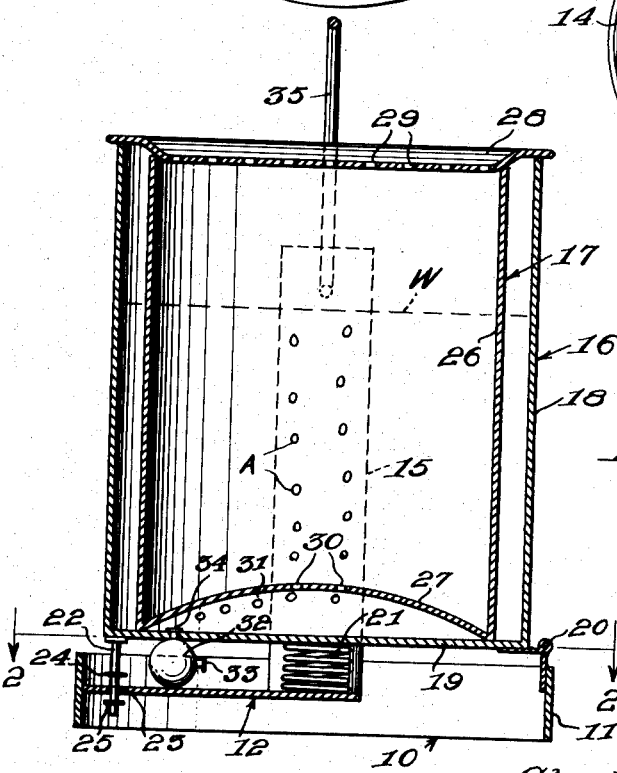
INVENTORS
Charles E. Stosberg.
Edward G. Furr
BY George E. Cook.
ATTORNEY Patented Sept. 21, 1954

2,689,428

UNITED STATES PATENT OFFICE 2,689,428

MINNOW BUCKET

Charles E. Stosberg and Edward G. Furr,
Fort Smith, Ark.

Application April 15, 1953, Serial No. 348,900

4 Claims. (Cl. 43—57)

This invention relates to a minnow bucket.

A primary object of the invention is to provide a minnow bucket wherein air is constantly admitted to water in the bucket upon vibratory movement thereto as occasioned by transportation thereof.

A further object of the invention is to provide a minnow bucket which is durable in construction and which is adapted for use with a minimum expenditure of time and effort as well as providing for the maintenance of the life of the minnows transported thereby.

Other objects and advantages of the invention will become apparent in the course of the following detailed description, taken in connection with the accompanying drawings, wherein—

Fig. 1 is a diametrical vertical sectional view of the bucket in accordance with a preferred structural embodiment thereof.

Fig. 2 is a horizontal sectional view as observed in the plane of line 2—2 on Fig. 1 in the direction of the arrows.

Fig. 3 is a top plan view on a reduced scale.

Referring now in detail to the drawing, 10 designates a base for the bucket proper. The base comprises a cylindrical member 11 of relatively large diameter but of relatively small dimension in height. Disposed within the cylindrical member 11 is a plate like member comprising a horizontal portion 12 which is of T formation and includes a portion 13 extending diametrically of the cylindrical member 11 and a stem portion 14 extending radially of the cylindrical portion at right angles to the portion 13.

A vertical bail supporting portion 15 projects vertically upward from each end of portion 13 and the entire plate-like member is rigidly secured within the cylindrical member 11 as by welding or any other desired means.

The bucket includes an outer vessel 16 and an inner vessel 17. The outer vessel 16 comprises a cylindrical wall 18 of slightly less diameter than the cylindrical base member 11 and is disposed in co-axial relation thereto, and the vessel 16 further comprises a flat bottom wall 19, the vessel having an open upper end.

The vessel 16 is connected with the base cylindrical member by means of a relatively wide hinge 20 disposed in diametrical alinement with the plate portion 14 and which has one leaf thereof rigidly connected to the base cylindrical member 11 and the other leaf thereof rigidly connected to the outer vessel bottom wall 19 adjacent the cylindrical wall 18 thereof.

The bottom wall 19 overlies the base cylindrical member 11 and is yieldably supported in a direction at right angles to that of the hinge 20 and the plate portion 14 on a pair of coil springs 21 or other suitable yieldable elements which are disposed upon the plate portion 13 adjacent the opposite ends thereof.

The bottom wall 19 has the upper end of a vertically elongated stop pin 22 secured thereto and which pin extends through an aperture 23 in the plate portion 14. A stop element 24 is supported by the pin 22 above and in normally spaced relation to the plate portion 14 and a second stop element 25 is supported by the pin below and in normally spaced relation to the plate portion 14, the stop elements being adapted to alternately engage the said plate portion 14.

The stop elements 24 and 25 may be vertically adjustably supported by the pin 22 for varying the vertical rocking movement of the outer vessel 16 about the hinge 20.

The inner vessel 17 is supported within the outer vessel 16 and comprises a cylindrical wall 26 in spaced concentric relation to the cylindrical wall 18 of the outer vessel 16 and an upwardly arched bottom wall 27 in spaced relation to the bottom wall 19 of the outer vessel 16. The inner vessel 17 is also provided with a normally open upper end and a cover 28 is provided for the open upper ends of both vessels and the area of the cover disposed above the inner vessel 17 is provided with a plurality of air apertures 29.

The bottom wall 27 of the inner vessel 17 is provided with air admission apertures 30 and valved pump means is provided for automatic supply of air into the space 31 between the bottom walls 19 and 27 and thence through the apertures 30 and into the inner vessel 17 which is filled with water to the level indicated at W, it of course being understood that the outer vessel 16 is also filled with water to the same level.

Said pump means in a preferred embodiment thereof comprises a relatively small hollow rubber spherical member 32 suitably supported between the bottom wall 19 and the plate portion 14 and an intake valve 33 communicating with the spherical member and disposed between the bottom wall 19 and plate portion 14 and an exhaust valve 34 communicating with the member 32 and the space 31 between the bottom walls 19 and 27.

The valves 33 and 34 may be of any well known form and per se form no part of the present invention.

A bucket carrying bail 35 has its opposite ends pivotally supported in the upper ends of the bail supporting portions 15.

Having set forth a preferred construction of the improved minnow bucket, the operation thereof is as follows:

The minnows are placed in the inner vessel 17 after which the apertured cover 28 is placed in position on the otherwise open upper ends of the inner and outer vessels. The bucket is normally as indicated in Fig. 1 wherein the outer vessel 16 is floatingly supported on the base 10 by means of hinge 20 and springs 21 and with the stop elements 24 and 25 in substantially spaced relation to the upper and lower faces of the plate portion 14.

The bucket in the process of transportation will be subject to vertical impulses which will result in a vertical swinging of the vessels about the hinge 20 within a range determined by the positions of the stop elements relative to the plate portion 14. This swinging or oscillating of the vessels causes the base 19 to alternately approach and recede from the base plate portion 12 with a resulting pulsating action of the pump acting spherical member 32 and by which air will be admitted by the inlet and exhaust valves 33 and 34 respectively into space 31 and thence through apertures 30 in the bottom wall 27 of the inner vessel 17 with resulting air bubbles ascending in the water as indicated at A in Fig. 1, the apertures 29 in the cover providing for a vertical flow of air through the water in the inner vessel.

While the pump means is disclosed in its preferred form as embodying the valved hollow rubber spherical member 32 disposed between the bottom wall 19 and plate portion 14, it is to be understood that the invention is not limited thereto, since various other forms of pump means such as piston or bellows types may be employed and furthermore, the pump means regardless of its particular form, may be operatively mounted between the base 10 and vessel 16 at points other than that disclosed.

Having disclosed our invention in accordance with a preferred structural embodiment thereof, what we claim and desire to secure by U. S. Letters Patent is:

1. A minnow bucket comprising a cylindrical base member, an outer vessel having a cylindrical wall co-axial with said base member and a flat bottom wall disposed above the base member, a hinge connection between said base member and said bottom wall, stop means carried by said bottom wall diametrically opposite said hinge connection and co-operating with said base member for limiting swinging movement of said vessel about said hinge connection, yieldable means disposed between said base member and said bottom wall and disposed between said hinge connection and said stop means, an inner minnow supporting vessel having a cylindrical wall in spaced relation to and co-axial with said first cylindrical wall, and a bottom wall upwardly arched in spaced relation to said first bottom wall providing an air directing space between same, said last bottom wall being provided with air admission apertures, and air pump means disposed between said base member and said first bottom wall operative upon swinging movement of said outer vessel for pumping air into said space and thence through said apertures and into said inner vessel.

2. The structure according to claim 1, wherein said base member includes diametrically opposed upwardly extending bail supporting members exteriorly of said outer vessel and a bucket carrying bail having its opposite ends pivotally connected to said supporting members.

3. The structure according to claim 1, together with a cover common to said inner and outer vessels and being provided with air apertures in its area overlying said inner vessel.

4. The structure according to claim 1, wherein said base member is provided with a horizontal plate member, and said yieldable means and said air pump means being supported on said plate member.

References Cited in the file of this patent

UNITED STATES PATENTS

| Number | Name | Date |
|--------|------|------|
| 724,539 | Bourne | Apr. 7, 1903 |

FOREIGN PATENTS

| Number | Country | Date |
|--------|---------|------|
| 12,782 | Great Britain | June 20, 1905 |